United States Patent Office 2,748,899
Patented June 5, 1956

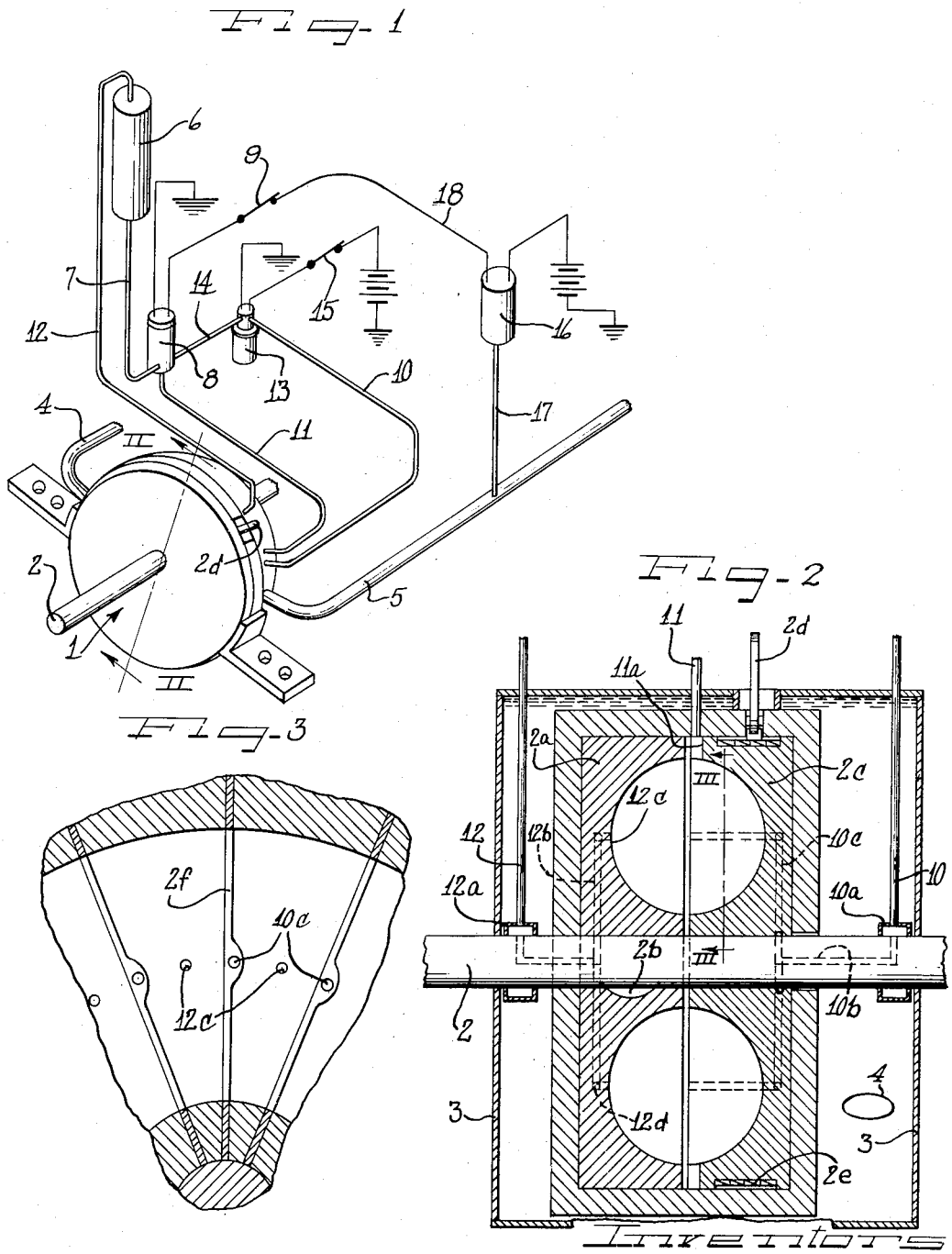
June 5, 1956  J. H. BOOTH ET AL  2,748,899
FLUID CONTROL SYSTEM FOR TORQUE ABSORBING
AND TRANSMITTING COUPLING
Filed Sept. 18, 1952
Inventors
James H. Booth
Edward J. Herbenar ða

2,748,899

FLUID CONTROL SYSTEM FOR TORQUE ABSORBING AND TRANSMITTING COUPLING

James H. Booth, Corunna, and Edward J. Herbenar, Detroit, Mich., assignors to Thompson Products, Inc., Cleveland, Ohio, a corporation of Ohio Application September 18, 1952, Serial No. 310,261

6 Claims. (Cl. 188—90)

This invention relates to a fluid system for the absorption of torque or the transmission thereof. More particularly the invention relates to a system of control for the operation of a hydro-mechanical brake in combination with a heat exchanger unit.

A major difficulty encountered by the military services, contractors, and numerous other groups of individuals faced with operation of machinery and personnel under extremely adverse conditions of cold, has been the inadequacy of portable heating facilities. The lack of proper heating facilities in large temporary buildings often used by such organizations very often seriously hampers the efficiency of the personnel.

Further, these organizations commonly use heavy machinery of the type utilizing diesel power plants. One of the disadvantages of the diesel type engine is that it requires a rather extensive warming-up period before it may be started or a rather lengthy period of turning the engine over to heat the combustion chamber through its own compression. The problem of starting these diesel engines for operation in extreme cold is so great that it is very common practice to keep at least one of the vehicles in twenty-four hour operation so as to be available for pushing other vehicles which are difficult to start in any other manner.

In accordance with the present invention, an apparatus is provided which effectively eliminates the difficulties hithertofore encountered in such maneuvers or operations in cold weather. This invention contemplates the provision of a hydraulic fluid coupling brake member which may be driven by any common source of power, for example, a gasoline engine. The driven rotor of the fluid coupling may be connected to a brake or other means for positively holding it fixed, or may in the alternative be allowed to rotate freely.

A hydraulic system is contemplated for transferring heat generated in the fluid coupling brake to a heat exchange unit which may be used to heat the surrounding atmosphere and a fluid system is also provided for controlling the operation of the fluid coupling. The control system is provided with a pressure operated switch, responsive to cessation of fluid flow to the heat exchanger, which will operate to prevent the further output of heat by the coupling.

It is, therefore, an object of the present invention to provide a superior torque absorbing fluid heat transfer system.

Another object of the present invention is the provision of a novel control system for the operation of a fluid torque absorption apparatus.

Still a further object of the present invention is the provision of control means for a fluid coupling torque absorbing apparatus whereby the fluid coupling may be emptied or filled to control the absorption of torque in a rapid manner.

Yet another feature is the inclusion of a three-way control valve operable to selectively fill or empty the fluid coupling but which may be automatically by-passed upon the drop of the pressure of the coupling cooling fluid below a predetermined point.

Other and further objects of the invention will be apparent to those skilled in the art from the following detailed description of the annexed drawings which, by way of a preferred example only, illustrate one embodiment of the invention.

On the drawings:

Figure 1 is a schematic diagram of the heat exchanger system of the present invention showing the controls thereof and their connections in the system;

Figure 2 is a cross-sectional view of the torque absorber taken along the lines II—II; and Figure 3 is a partial cross sectional view taken along the lines III—III of Figure 2.

As shown on the drawings:

As shown in Figure 1, a fluid torque absorber generally indicated at 1 is provided having a drive shaft 2. Conduits 4 and 5 are provided for circulating cooling water or other fluid medium through a water jacket which surrounds the working turbine or fluid coupling elements of the fluid torque absorber. The conduits 4 and 5 connect the torque absorber water jacket to the heat exchanger (not shown) which is adapted to transfer the heat content of the cooling fluid to the surrounding atmosphere.

It is contemplated that a circulating pump, which is not shown, be used to circulate the fluid in the conduits 4 and 5, thus placing the fluid under a positive pressure during operation. It is also contemplated that power from the source applying torque to the input shaft 2 of the torque absorber be utilized in operating a fan or other means for circulating air through the heat exchanger.

Operation of the fluid coupling 1 is controlled through the supply and removal of working fluid between the vanes of the input and output impeller of the torque absorber. For purposes of controlling the working fluid contents of the absorber, a novel fluid controlling system is provided. As is shown in Figure 1, an accumulator 6 is provided for the storage of fluid. A conduit 7 leads from the accumulator to the three-way control valve 8 which is under control of the manual switch 9. A loading conduit 10 is provided between the three-way valve 8 and the rotor cavity of the absorber and an unloading conduit 11 leads from a point of maximum pressure in the rotor compartment to the three-way valve 8. A bleed conduit 12 is provided for aiding the circulation of working fluid into and out of the absorber.

An electric pump 13 is provided in the loading conduit 10 and is connected to the three-way valve 8 by means of an intermediate conduit 14. The pump 13 is controlled by a switch 15 which is intended to be operated manually.

A further automatic control in the system is provided by means of the pressure switch 16 which is connected to the conduit 5 by means of the bleed line 17. The pressure switch 16 is opened upon a reduction of the pressure in the line 4, as sensed by cooling water in the bleed line 17. As may be seen from Figure 1, opening of the switch 16 prevents current from passing through the line 18 to the switch 9 and the valve 8. This prevents current from reaching the valve 8 and the valve is therefore returned to a position in which conduits 7 and 11 are connected and conduit 14 is blocked off. The line 18 is in series with the switch 9 so that the valve 8 can never be operated into the position in which it connects the conduits 7 and 14 for loading the torque absorber when there is no water pressure in the conduit 5, and therefore when conduit 5 is not connected for circulating the cooling water.

As is shown in Figure 2, the torque absorber of the present invention comprises an input drive shaft 2 which is fixedly secured to an impeller 2a by means of a key 2b. Rotatably mounted on the shaft 2 is a freely rotatable driven element 2c. The member 2c may be braked by means of any conventional brake, for example, one having a friction brake band 2e which can be contracted about the outer periphery of the member 2c by conventional means such as a cam lever 2d to securely lock the member 2c against rotation when the torque absorber is to be placed in service. When in frequent intermittent or constant service, the brake will be left in the "on" position at all times.

As shown in the exemplary diagram of Figure 2, a conventional collar 12a is provided for connecting the bleed line 12 to the bleed conduit 12b in the impeller 2a. The bleed line 12b enters the area between the coupling members 2a and 2c at a point at the bottom of or at a point along the inner radius of the cups in the impeller torus. As shown at 12c we have provided an inlet at the bottom of the cup, which inlet is fed by the header 12d.

The loading conduit 10 feeds into the collar 10a which in turn feeds into the line 10b in the shaft 2. The line 10b connects to the conduit 10c in the driven element 2c by means of conventional rotating collar-type connections. As may be clearly seen from the dotted lines of Figure 3, the conduit 10c forms a header which empties into the cavity between the rotors 2a and 2c at the center point of the annulus formed by the two rotors, through the back sides of the vanes 2f.

The unloading conduit 11 is connected at the outer periphery of the rotor and is fed by means of the conduits 11a provided in the periphery of the rotor 2c.

In operation, assuming that cooling water is circulating in the conduits 4 and 5, the control switch 9 is closed thus energizing the valve 8 into a position in which the conduits 7 and 14 are connected. The switch 15 is also closed and the pump 13 operates to drain fluid from the accumulator 6 through the conduit 7 to conduit 14 and from thence through the conduit 10 and conduit 10c into the annular space between the rotors 2a and 2c. At the same time that the fluid is being introduced by the conduit 10c, air is automatically drawn through the bleed conduit 12 back into the accumulator 6 thereby allowing the fluid to more rapidly fill the torque absorber.

Should the pressure in the conduits 4 and 5 inadvertently fail thereby endangering the brake unit by overheating the coupling elements and the usual fluid seals associated therewith, or should the switch 9 be opened manually, the valve 8 closes thereby connecting conduits 7 and 11 and blocking off conduits 7 and 14 with the effect that fluid in the absorber will pass, due to the centrifugal force acting upon it, out through the conduits 11a and 11 through the conduit 7 into the accumulator 6. During this unloading procedure the conduit 12 acts to allow air to pass from the accumulator 6 into the coupling, thereby allowing the torque absorber to empty rapidly.

Due to the centrifugal force acting upon the fluid no pump is needed in the unloading action and it is therefore not necessary that the pump 13 be operating. Thus, it is possible to place the pump 13 in series with the switch 9 if so desired. This would cause operation of the pump 13 at all times when the control switch 9 is closed and the valve 8 is in a position to connect the conduits 7 and 14. The pump 13 would be inoperative, also, at any time when the pressure switch 16 is open, or the control switch 9 is open, during both of which times the torque absorber will be unloading under the influence of centrifugal force acting upon the working fluid.

We intend that the drive shaft 2 be used to constitute a drive link between a power source and driven implements such as an air compressor, small vehicle, or any other means requiring power, or that the coupling be utilized for the generation of heat. During operation of the fluid coupling as a heat supplying element, the driven rotor will act as a fluid brake which will cause all of the energy of the rotating driving element 2 to be changed into heat. The heat thus generated will be transferred through the water jacket 3 to the cooling fluid in the conduit system 4 and 5 and from thence to an appropriate heat exchanger in which it is transferred to the surrounding atmosphere. It has been found that this type of heater is extremely satisfactory for portable use in temporary buildings, etc., for use in warming up diesel engines and other similar hard-starting power plants in extreme conditions of cold.

In heating diesel engines, the heat in the conduits 4 and 5 may be transferred to the diesel by means of a water-to-air radiator with a fan, or the conduits 4 and 5 may be connected directly to the inlet and outlet of the cooling water jacket of the cold engine through standard outlets.

As may clearly be seen from the above disclosure, we have provided a novel and very effective control system for use with a torque absorbing hydro-heater in which it is desired to transform mechanical energy into heat. The present control system permits the functioning of such apparatus in optimum manner with a maximum of simplicity, rapidity and efficiency.

It will be understood that modifications and variations may be effected without departing from the scope of the novel concepts of the present invention.

We claim as our invention:

1. In combination in a heat exchange apparatus, fluid brake means operable as a heat generator when filled with operating fluid, first means for supplying said fluid to said brake means, second means for emptying the operating fluid from said brake means, circulating cooling fluid for said brake means, fluid confining means for directing said circulating cooling fluid in cooling relation with said brake means, and means associated with said fluid confining means and responsive to a reduction in the circulating pressure of the cooling fluid to automatically disconnect said first means and connect said second means.

2. In combination in a heat exchange apparatus, a fluid brake for generating heat, first conduit means for loading said fluid brake for operation, second conduit means for unloading said fluid brake to render it inoperative, an accumulator, third conduit means connecting said fluid brake to said accumulator and fourth conduit means connecting said accumulator to a control valve for selectively supplying fluid from said accumulator to either said first or said second conduit, first switch means for electrically energizing said first control valve into a first position whereby said first and said fourth conduits are connected, pump means in said first conduit for forcing fluid from said accumulator into said fluid brake, and safety switch means for deenergizing said first control valve and thereby connecting said fourth and said second conduits for unloading said fluid brake and rendering it inoperative, said third conduit means providing an air bleed for permitting rapid loading or unloading of said fluid brake.

3. In combination in a heat exchange apparatus, a fluid brake for generating heat, said fluid brake being operative only when filled with working fluid, a source of working fluid, a first control valve connected to said source for selectively connecting said source to first and second conduits, said first conduit comprising a loading conduit and said second conduit comprising an unloading conduit, and safety switch means responsive to circulation of a cooling circulating medium and electrically connected to said first control valve whereby failure of said circulating medium to circulate through and thereby cool said fluid brake will cause said first control valve to connect said source to said second unloading conduit thereby permitting the fluid brake to become inoperative.

4. In combination in a heat exchange apparatus, fluid brake means operable as a heat generator when filled with operating fluid, pump means for supplying fluid to said brake means from an accumulator, second means for emptying the operating fluid from said brake means, fluid circulating means for passing cooling fluid around said fluid brake for absorbing heat therefrom, and means associated with said fluid circulating means and responsive to a drop in the circulating pressure of said cooling fluid for actuating said second means for emptying the operating fluid from said brake means.

5. In combination in a heat exchange apparatus, fluid brake means operable as a heat generator when filled with operating fluid, a first means for supplying said fluid to said brake means, said first means comprising a first conduit connected to a fluid source by a control valve, second means for emptying the operating fluid from said brake means, said second means comprising a second conduit connected to said valve for control thereby, circulating water for extracting the heat from said brake means and means responsive to the operating pressure in said circulating water for controlling said valve to cause said valve to connect said emptying conduit to said source for unloading said brake means when the circulating pressure of said circulating water drops below a safe value.

6. In a heat exchange system including a torque-absorbing fluid coupling, one side of which is fixable and the other side of which is secured for rotation with a source of power, a cooling medium for dissipating the heat generated therein and means for circulating said cooling medium under a positive pressure in heat transfer relation with said coupling, a control system for said coupling which comprises, a first conduit for filling said coupling, a second conduit for emptying said coupling, a first electrically energized control valve, an accumulator, a first manual control switch, and a second control switch responsive to a decrease in pressure of said cooling medium to move into open position, a third conduit connecting said accumulator to said first control valve, separate outlet means in said first control valve for connecting said third conduit to said first conduit when said first valve is energized or to said second conduit when said first valve is deenergized, pump means in said first conduit for causing circulation from said accumulator into said coupling and electrical connecting means connecting said first and second control switches to a source of electricity and to said first control valve whereby a decrease in the circulating pressure in the cooling medium will cause said second control switch to open to thereby connect said accumulator to said second conduit whereby said torque-absorbing fluid coupling may displace its working fluid into said accumulator by means of centrifugal force developed within the fluid coupling by rotation of said other side of said coupling.

References Cited in the file of this patent

UNITED STATES PATENTS

| | | |
|---|---|---|
| 1,217,591 | Goldmerstein | Feb. 27, 1917 |
| 1,915,547 | North et al. | June 27, 1933 |
| 2,287,130 | Ramey | June 23, 1942 |
| 2,421,056 | Dake et al. | May 27, 1947 |
| 2,452,550 | Cline | Nov. 2, 1948 |
| 2,526,842 | Bessiere et al. | Oct. 24, 1950 |
| 2,667,238 | Bennett | Jan. 26, 1954 |

FOREIGN PATENTS

| | | |
|---|---|---|
| 537,867 | Germany | Nov. 7, 1931 |